Aug. 8, 1933.   H. L. WARREN   1,921,959
MATERIAL TRANSPORTING AND HANDLING APPARATUS
Filed May 27, 1932   2 Sheets-Sheet 1
Fig. 1.
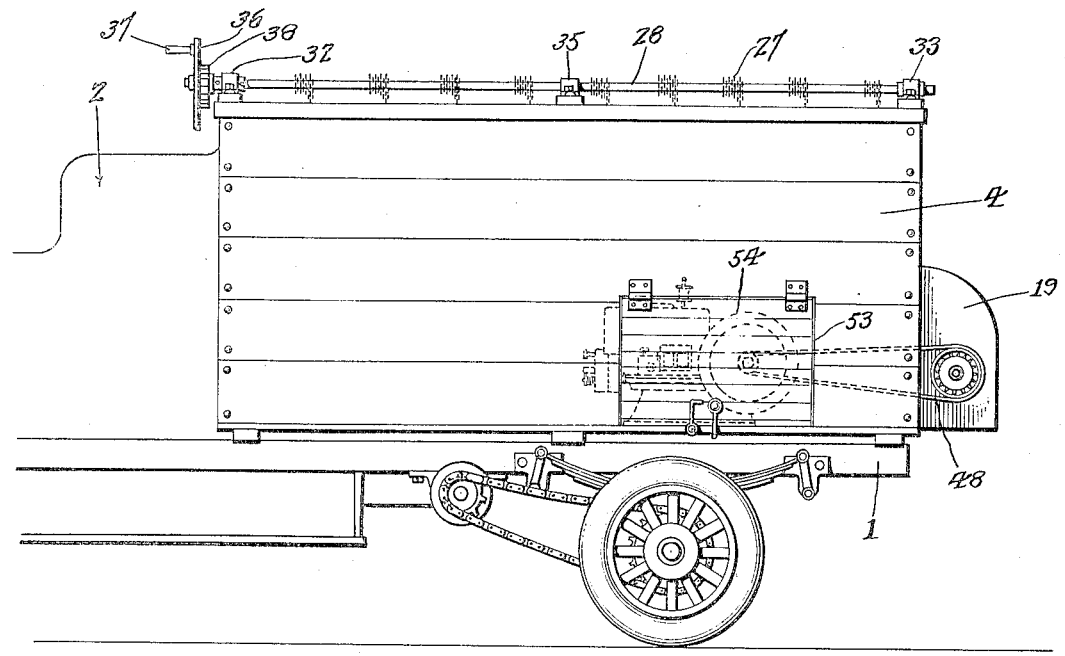
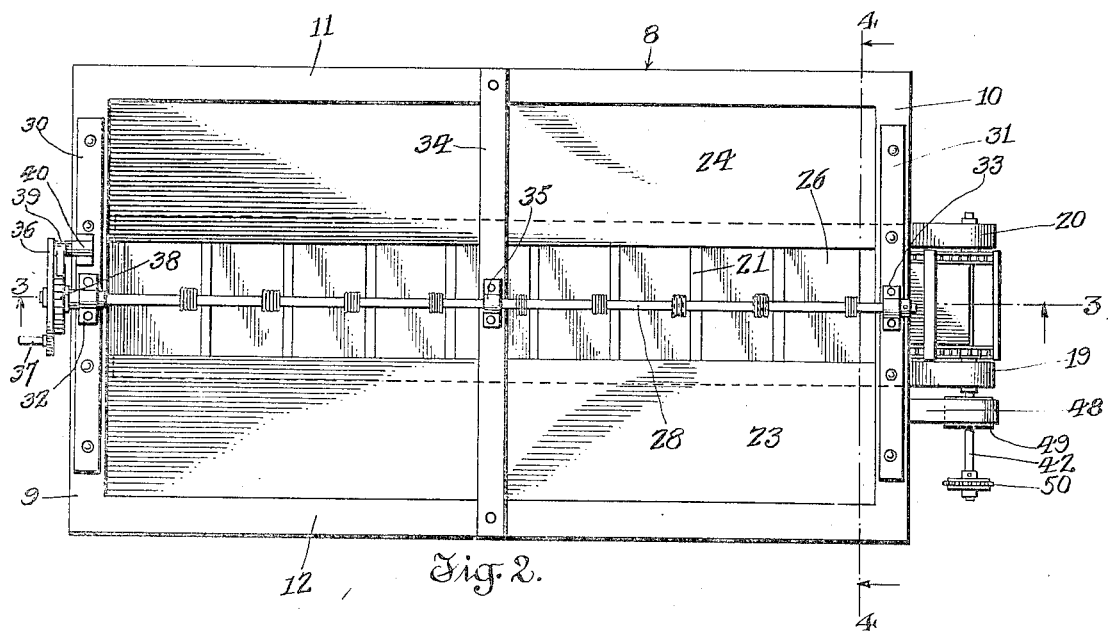
Fig. 2.
Inventor.
Harry L. Warren
Geo. P. Kimmel
ATTORNEY Aug. 8, 1933. H. L. WARREN 1,921,959
MATERIAL TRANSPORTING AND HANDLING APPARATUS
Filed May 27, 1932 2 Sheets-Sheet 2
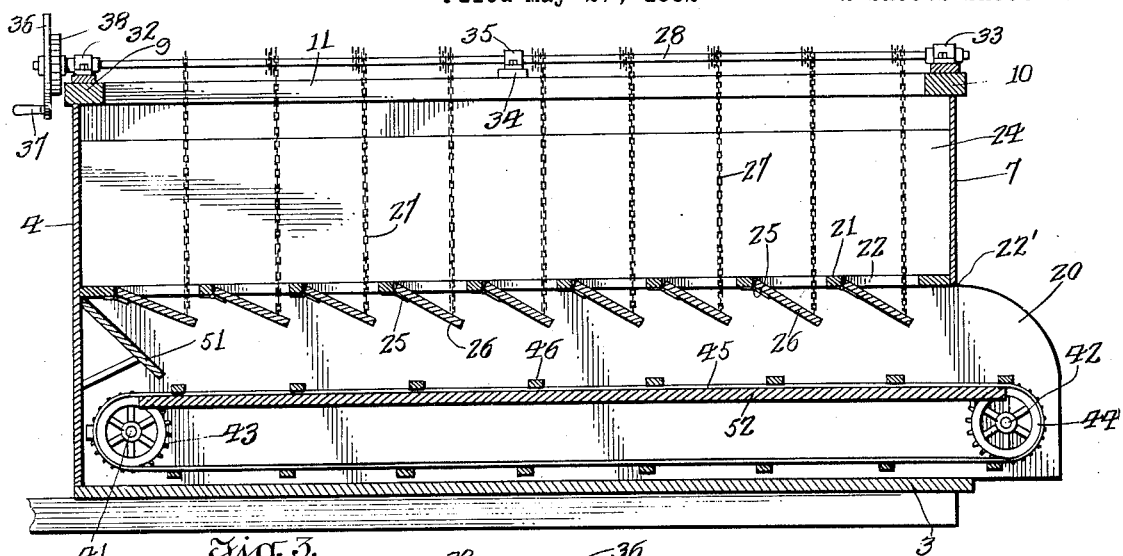
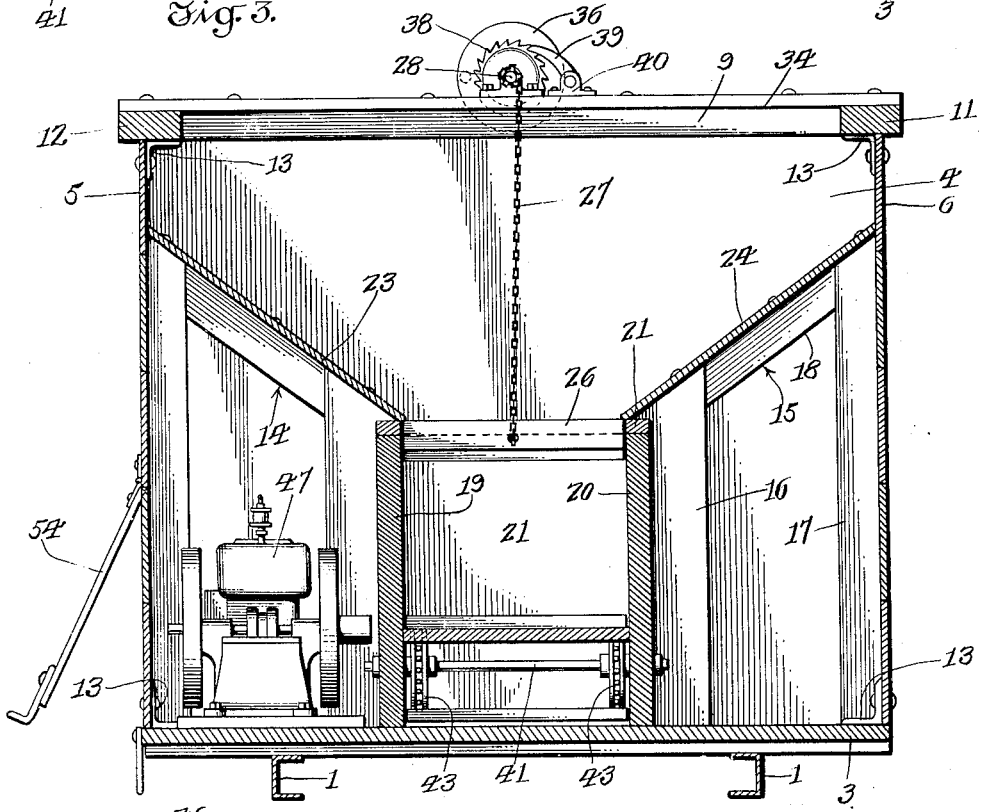
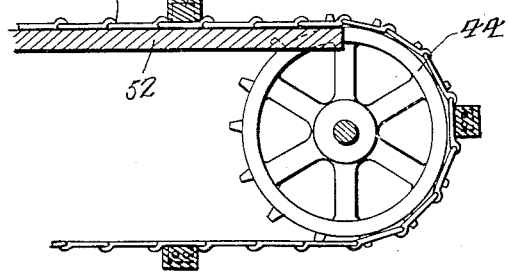
Inventor.
Harry L. Warren
Geo. P. Kimmel
ATTORNEY Patented Aug. 8, 1933

1,921,959

UNITED STATES PATENT OFFICE 1,921,959

MATERIAL TRANSPORTING AND HANDLING APPARATUS

Harry L. Warren, Kinmundy, Ill.

Application May 27, 1932. Serial No. 614,024

1 Claim. (Cl. 214—83)

This invention relates to an apparatus for use in connection with the transporting and handling of limestone, but it is to be understood that an apparatus, in accordance with this invention may be used for transporting and handling any character of material for which it may be found applicable, and has for its object to provide, in a manner as hereinafter set forth, an apparatus of the class referred to constructed in the form of a unit capable of being positioned upon and carried by a vehicle for transportation by the latter.

A further object of the invention is to provide, in a manner as hereinafter set forth, an apparatus for transporting and handling material in the form of a unit for mounting upon a transporting vehicle therefor and including a load carrying part having a normally closed sectional dumping bottom, a conveyor part for discharging the load, and means to provide for holding the weight of the load from off the conveyor part during the transportation of the unit.

A further object of the invention is to provide, in a manner as hereinafter set forth, an apparatus for transporting and handling material in the form of a unit for mounting upon a transporting vehicle therefor and including self contained means for discharging the load carried thereby in a spread-like manner when desired.

A further object of the invention is to provide, in a manner as hereinafter set forth, an apparatus for transporting and handling material in the form of a unit for mounting upon a transporting vehicle therefor and including a hopper-like load carrying part formed with a normally closed sectional dumping bottom, a conveyor part for discharging the load in a spread-like manner, and self contained means for operating the conveyor part and releasing the sectional dumping bottom when occasion requires.

Further objects of the invention are to provide, in a manner as hereinafter set forth, an apparatus for the purpose referred to which is comparatively simple in its construction and arrangement, strong, durable, compact, thoroughly efficient in its use, readily assembled, conveniently repaired when occasion requires, and comparatively inexpensive to manufacture.

To the above ends essentially, and to others which may hereinafter appear, the invention consists of such parts, and such combination of parts which fall within the scope of the invention as claimed.

In the drawings:—

Figure 1 is a side elevation of a material transporting and handling apparatus, in accordance with this invention, and further showing the apparatus mounted upon a truck.

Figure 2 is a top plan view of the apparatus.

Figure 3 is a section on line 3—3 Figure 2.

Figure 4 is a section on line 4—4 Figure 2.

Figure 5 is a fragmentary view in section of the conveyor element.

The apparatus when used is adapted to be mounted upon and secured in any suitable manner to a vehicle and is illustrated by way of example as positioned upon the rear of the chassis 1 of an automotive truck 2.

The apparatus is in the form of a rectangular body formed of a braced bottom 3, a front wall 4, a pair of side walls 5, 6 and an end wall 7. Positioned upon the top edges of the walls 4, 5, 6 and 7 is a reinforcing frame 8 consisting of flat frame members 9, 10, 11 and 12 of a width greater than the width and extending outwardly and inwardly with respect to such edges. Angle irons 13 are positioned against and secured to the inner faces of the said walls, upper face of said bottom and lower face of the frame to anchor the latter in superimposed position with respect to the edges referred to.

Mounted upon the bottom 3 are spaced, parallel oppositely disposed supports 14, 15 of like form. The supports abut the inner faces of the walls 5, 6. Each support includes an inner vertical standard 16, an outer vertical standard 17 of greater height than standard 16 and a top bar 18 connecting the standards 16 and 17 together. The upper end of each standard inclines downwardly from its outer side edge towards its inner side edge. The bar 18 is inclined in the same manner as the upper ends of the standards.

Arranged upon bottom 3 is a pair of upstanding, opposed, spaced parallel substantially oblong plates 19, 20 which are disposed lengthwise of and are of greater length than said bottom. The plates 19, 20 extend from the inner face of wall 4 and project rearwardly from wall 7 and in connection with bottom 3 forms a conveyor compartment 21. The plates 19, 20 are arranged against the inner standards of the supports 14, 15 and are seated on their lower lengthwise edges.

Positioned upon the top edges of the plates 19, 20 and bridging the space between the latter is a flat rectangular member 21 formed with spaced transversely extending rectangular openings 22. The member 21 has its ends abut the inner faces of the walls 4, 7, the latter being cutout centrally of its lower portion to form an opening or clearance 22′ for the rearward extending of the plates 19, 20. Secured on the supports 14, 15, extending from wall 4 to wall 7 and seated upon the sides of member 21 are oppositely inclined plates 23, 24 which abut the side walls 5, 6 and incline downwardly therefrom. Arranged in each opening 22 and hinged to member 21, as at 25 is a gate 26. The gates function, when in normal position to close the openings 22. The plates 23, 24, that part of the walls 4, 5, 6 and 7 above said plates, the member 21 and the gates 26 provide a hopper to receive the material to be transported. The member 20 in connection with the gates 26 form a sectional dumping bottom for the hopper.

The gates 26 are normally maintained in closed position by a set of chains 27 winding on and unwinding from a shaft 28 common to said set. Each gate has a chain 27 attached thereto, as at 29. Mounted on and secured to the frame members 9 and 10 are flat strips 30, 31 respectively to which are secured centrally thereof bearings 32, 33 respectively. Extending transversely of frame 8, at the center of the latter and secured to frame members 11, 12 is a flat support 34 having secured thereon, centrally thereof a bearing 35 which aligns with bearings 32, 33. The shaft 28 is journaled in the bearings 32, 33 and 35 and extends from bearing 32. Adjacent and outwardly with respect to the latter, the shaft 28 is provided with a disc 36 having an eccentrically disposed handle 37. Inwardly with respect to disc 36 the shaft 28 carries a ratchet wheel 38, which coacts with a pivoted dog 39 for latching shaft 28 when desired. The dog 39 is pivotally supported, as at 40 on strip 30.

Journaled in the plates 19, 20 at the forward part thereof is a shaft 41. Journaled in the plates 19, 20 in proximity to the rear ends thereof and outwardly with respect to wall 7 is a shaft 42. The shaft 41 is provided with a pair of sprocket wheels 43 and shaft 42 with a pair of sprocket wheels 44. Travelling over and engaging with the wheels 43, 44 is an endless flexible conveying belt 45 provided with spaced transversely extended material shifting members 46.

Arranged between plate 23 and wall 5 and upon bottom 3 is a power plant 47 and between the latter and shaft 42 is a driving connection 48 for the latter. Shaft 42 is extended and carries a pulley 49 driven from connection 48 and it is also provided with a sprocket 50. The latter is adapted to be attached to an external power source for operating shaft 42. A deflector 51 is arranged at the forward end of compartment 21. A support 52 is attached to plates 19, 20 for supporting the upper stretch of belt 45. The wall 4 has an opening 53 so access can be had to power unit 47. Opening 53 is normally closed by a hinged gate 54.

The shafts 41, 42, wheels 43, 44 and belt 45 provide a material conveyor mechanism arranged within and extending rearwardly from compartment 21 and such mechanism functions to discharge and spread the material dumped thereon from the hopper.

The gates 26 when closed and when a load of material has been supplied to the hopper will hold the weight of the load from off the conveyor mechanism during the transporting of the load.

What I claim is:—

In a material transporting and handling apparatus adapted to be carried by a mobile structure and of that type including an open top and closed bottom container having one of its sides provided with an entrance opening therefor, the combination of means arranged within the upper portion of the container and providing in connection with the sides and ends of the latter an open bottom material holding hopper, means arranged within the lower portion of and spaced from the sides of the container and in connection with the bottom of the latter providing an open top conveyor compartment open to said hopper bottom, a flat support interposed between and coextensive with the length of the hopper and compartment and provided with a series of spaced openings aligning with the open top of the compartment, gates within and hinged to the support and normally depending into said compartment, a conveyor in said compartment, means mounted on the top of and extending lengthwise of the container for elevating the gates to close said spaced openings, a motor within and mounted upon the bottom of said container in proximity to said entrance opening, and a conveyor drive leading from said motor.

HARRY L. WARREN.